United States Patent
Nair

(10) Patent No.: US 11,657,851 B2
(45) Date of Patent: May 23, 2023

(54) SYSTEM AND DEVICE FOR REMOTE AUTOMATIC EDITOR

(71) Applicant: VIACOM INTERNATIONAL INC., New York, NY (US)

(72) Inventor: Rohit Nair, Dubai (AE)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

(21) Appl. No.: 17/303,255

(22) Filed: May 25, 2021

(65) Prior Publication Data

US 2022/0383902 A1 Dec. 1, 2022

(51) Int. Cl.
*G11B 27/031* (2006.01)
*G11B 27/34* (2006.01)
*H04N 21/239* (2011.01)
*H04N 21/2343* (2011.01)
*H04L 67/56* (2022.01)

(52) U.S. Cl.
CPC .......... *G11B 27/031* (2013.01); *G11B 27/34* (2013.01); *H04L 67/56* (2022.05); *H04N 21/2393* (2013.01); *H04N 21/234309* (2013.01)

(58) Field of Classification Search
CPC ....... G11B 27/031; G11B 27/34; H04L 67/28; H04N 21/234309; H04N 21/2393
See application file for complete search history.

(56) References Cited

U.S. PATENT DOCUMENTS

| | | | |
|---|---|---|---|
| 8,768,142 B1 | 7/2014 | Ju et al. | |
| 9,032,297 B2 | 5/2015 | Lovejoy et al. | |
| 10,388,324 B2 | 8/2019 | Manville et al. | |
| 10,491,778 B2 | 11/2019 | De Mers et al. | |
| 2011/0206351 A1 | 8/2011 | Givoly | |
| 2012/0158891 A1* | 6/2012 | Dooley | H04L 67/5681 709/217 |
| 2013/0262381 A1* | 10/2013 | Fourcher | H04N 21/854 707/634 |
| 2014/0164636 A1* | 6/2014 | Silvestri | H04N 21/85 709/231 |
| 2015/0089026 A1* | 3/2015 | Payette | H04L 65/60 709/219 |
| 2018/0167698 A1* | 6/2018 | Mercer | G11B 27/031 |

* cited by examiner

*Primary Examiner* — Girumsew Wendmagegn
(74) *Attorney, Agent, or Firm* — Fay Kaplun & Marcin, LLP

(57) ABSTRACT

A system for remote editing of a file includes a database including a plurality of source media content files and a content host configured to generate a first proxy for at least a portion of a first one of the source media content files, the first proxy including data sufficient to enable a remote user device to identify a portion of content of the first source media content file to be included in a generated clip, the content host configured to receive from the remote user device a request to create the generated clip from the first source media content file, the request indicating parameters defining, based on the data in the first proxy, the portion of the first source media content file to be included in the generated clip, the content host configured to create the generated clip based on the parameters indicated in the request.

20 Claims, 3 Drawing Sheets

SYSTEM AND DEVICE FOR REMOTE AUTOMATIC EDITOR

BACKGROUND INFORMATION

Media content, such as a video, may, for example, be edited to select a clip or a snippet to provide promotional material for the media content. Such a clip may be generated and posted to, e.g., a social media account or another digital platform. However, if a user wants to generate a clip from a high-resolution video, the user must first be granted access to the high-resolution file (e.g., of an entire media property from which the clip is to be edited).

Conventionally, the typical user then executes sophisticated editing software. This generally requires significant editing skills especially if any graphics or other items are to be inserted into the clip (e.g., a logo, endboard, etc.). To perform such activities remotely (e.g., outside an office in which large valuable files may be securely and easily transferred through internal channels) requires the release of these files into a relatively uncontrolled environment for storage and manipulation on end user devices. Furthermore, these devices and the channels by which they receive and disseminate information may be poorly equipped to handle data intensive applications, to run sophisticated software and/or to maintain a desired level of security for valuable media files.

SUMMARY

Some exemplary embodiments include a system for remote editing of a file comprising a database including a plurality of source media content files and a content host configured to generate a first proxy for at least a portion of a first one of the source media content files, the first proxy including data sufficient to enable a remote user device to identify a portion of content of the first source media content file to be included in a generated clip, the content host configured to receive from the remote user device a request to create the generated clip from the first source media content file, the request indicating parameters defining, based on the data in the first proxy, the portion of the first source media content file to be included in the generated clip, the content host configured to create the generated clip based on the parameters indicated in the request.

The present embodiments are also directed to a user device, comprising a display and a communications interface in combination with a processor configured to perform operations including displaying a proxy for at least a portion of a source media content file, the proxy including data sufficient to enable the user device to identify a portion of content of the source media content file to be included in a generated clip; and transmitting, by the communications interface, a request to create the generated clip from the source media content file, the request indicating parameters defining, based on the data in the proxy, the portion of the source media content file to be included in the generated clip.

DETAILED DESCRIPTION

Figure 1:
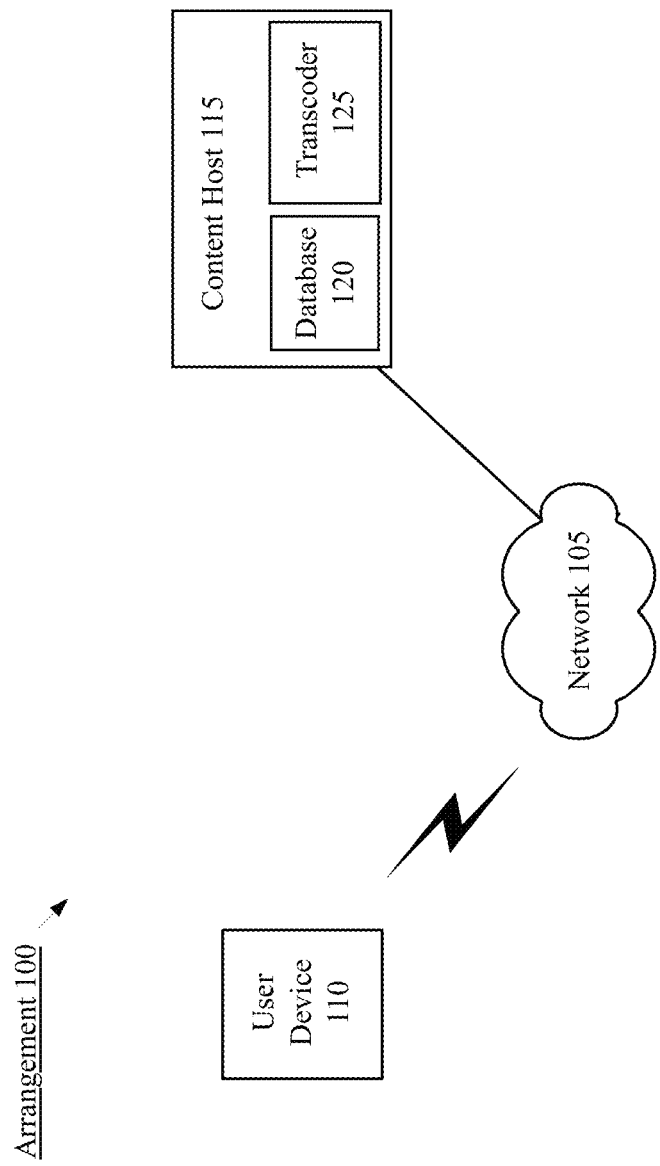
FIG. 1 shows an exemplary system arrangement according to various exemplary embodiments.

The exemplary embodiments may be further understood with reference to the following description and the related appended drawings, wherein like elements are provided with the same reference numerals. The exemplary embodiments describe devices, systems and methods for generating clips of media content (e.g., a high-resolution long-form video) remotely from a site at which the media content is stored.

The exemplary embodiments describe a system including a user device configured to generate and transmit a request to a content host. In one embodiment, the request includes instructions (e.g., parameters) defining the clip of the high-resolution long-form video to be generated. The parameters may, for example, be generated by a remote user based on review of an editing file corresponding to the media content (e.g., a low-resolution and/or watermarked version of the media content). The content host is configured to transcode the clip from the source media content based on these parameters to generate a clip as defined from the media content (e.g., the high-resolution long-form video) where the clip has properties the same as those of the media content (e.g., high-resolution).

The content host may then provide the clip to the remote user device for the user device to store and/or use the clip as needed. For example, the user of the remote device may post the clip on a digital platform directly from the remote user device. Thus, high-resolution clips may be created for use by the remote user device without requiring any transmission of the media content to the remote user device. That is, the user performs editing steps on the remote user device on an editing file to create a facsimile of the desired clip without ever accessing the media content itself.

The parameters defining this facsimile of the desired clip are then transmitted to the repository within which the media content itself is stored and are executed by, for example, a server computer (comprising, e.g., a transcoder) at a secure location, to generate a corresponding high-resolution clip as desired. This high-resolution clip may then be transferred to the remote user device or any other device without taxing the resources as would be required by a transfer of a full copy of the media content and without releasing the media content into an unsecure environment.

FIG. 1 shows an exemplary system arrangement 100 according to various exemplary embodiments. The arrangement 100 includes a network 105 providing network access to a user device 110 and a content host 115. Those skilled in the art will understand that the user device 110 may be any type of electronic component that is configured to communicate via a network, e.g., a mobile phone, a tablet computer, a smartphone, a laptop computer, a desktop computer, a set top box, a multimedia receiver, a smart TV, a game console, a wearable device, an internet of things (IoT) device, etc. Thus, the user device 110 may represent any electronic device equipped with hardware, software and/or firmware configured with a processor for performing communications with a content host via a network and generating video content for viewing on a display, to be explained in further detail below. Reference to a single user device 110 in the arrangement 100 is only for illustrative purposes, and other system arrangements may include any number of user devices being used by any number of users interconnected in any known manner.

The network 105 may represent one or more networks. The user device 110 and the content host 115 may each connect to the network 105 wirelessly or using a wired connection. Those skilled in the art will understand the procedures and protocols that may be implemented for each of the user device 110 and the content host 115 to connect to the network 105 and communicate with a remote endpoint via the network connection. For example, the network 105 may comprise a cloud computing platform, e.g., Azure, including network protocols for communications between the user device 100 and the content host 115.

In the example of FIG. 1, the content host 115 is shown as having a wired connection to the network 105, and the user device 110 is shown as having a wireless connection. It should be understood that each of the components 110, 115 may connect in any manner to the network 105. In addition, the network 105 may represent one or more networks. For example, the entity providing the content host 115 may have an internal network (e.g., LAN) that connects to the public Internet to provide various services. Thus, it should be understood that network 105 may represent any manner and/or network used to connect the various components of arrangement 100.

The user device 110 may be equipped with a video player configured to generate video and/or audio output based on, at least in part, multimedia data received directly or indirectly from the content host 115. In some embodiments, the user device 110 accesses the content host 115 and/or views a video provided by the content host 115 via a user-facing application. In other embodiments, the user device 110 accesses the content host 115, or content provided by the content host 115, via a web browser. However, any reference to the user device 110 accessing the content host 115 in any particular manner is provided for illustrative purposes only. The exemplary embodiments may apply to the user device 110 accessing the content host 115 in any appropriate manner as would be understood by those skilled in the art.

The user device 110 may also be equipped with a clip request generator configured to transmit a request to the content host 115 for creating a video clip. The request in one embodiment is generated via a user-facing application configured, for example, as another aspect of the application used to view the video content provided by the content host 115. In some embodiments, the user device 110 includes storage sufficient for storing a video and/or a video clip to be viewed, which may include a high-resolution video and/or video clip. However, for reasons to be explained below, a high storage capacity is not required for the user device 110 to perform certain exemplary embodiments described herein. For example, the user device 110 may require only enough processing and/or storage to stream and/or store a low-resolution proxy of a high-resolution video and to provide instructions which may be executed on another device to create a high-resolution clip of high-resolution video content.

The content host 115 of this embodiment includes a database 120 storing media content, e.g., high-resolution video content. According to one aspect of the present disclosure, the content host 115 is configured to store in the database 120 a library of high-resolution videos that may be provided in a secure (e.g., non-editable) format to end users, for example, for viewing. The database 120 of this embodiment further stores a library of high-resolution (or different resolution/format) clips of the high-resolution videos, for example, promotional clips for videos, and lower-resolution (or different resolution/watermarked) proxies of the high-resolution videos, to be explained in further detail below.

Those skilled in the art will understand that the database 120 may comprise multiple databases and may include additional content stored for use by the content host 115. Additionally, the database 120 may be maintained remotely from the content host 115.

The content host 115 further includes a transcoder 125 configured to perform operations including decoding, altering, and/or re-encoding media content. Those skilled in the art will understand that a transcoder generally performs functions related to converting media content from one encoding format to a different encoding format, editing the content, inserting graphics into the content, etc. The transcoder 125 described in FIG. 1 is not limited to the functionalities described herein and may include additional functionalities. Further, the term "transcoder" may refer to one or more transcoders performing various different aspects of the embodiments described herein. For example, the content host may use a workflow system, e.g., Rhozet, including networks of transcoder nodes configured for processing transcoding tasks in a distributed arrangement.

The content host 115 further includes a communications interface (not shown) and a processing apparatus (not shown). The communications interface is configured to perform communications via the network, including communications with the user device 110. For example, the communications interface may provide media content from the database 120 to the remote user device 110 and receive clip generation requests from the remote user device 110. The communications interface may further upload media content/clips to a server and/or a web-based portal for access by the user device. The processing apparatus may perform workflow functions related to the clip generation process, for example generating tasks for the transcoder 125 based on the request from the user device 100.

According to another aspect of the present disclosure, the content host 115 is configured to generate, with the transcoder 125, a proxy for the high-resolution media content stored in the database 120 (e.g., a low-resolution file of the same content included in the high-resolution media content or a file of the same content including a watermark or otherwise rendered undesirable to parties wishing, e.g., to pirate the material). Alternatively, the proxy may be made available to the transcoder 125 in other ways.

Figure 2:
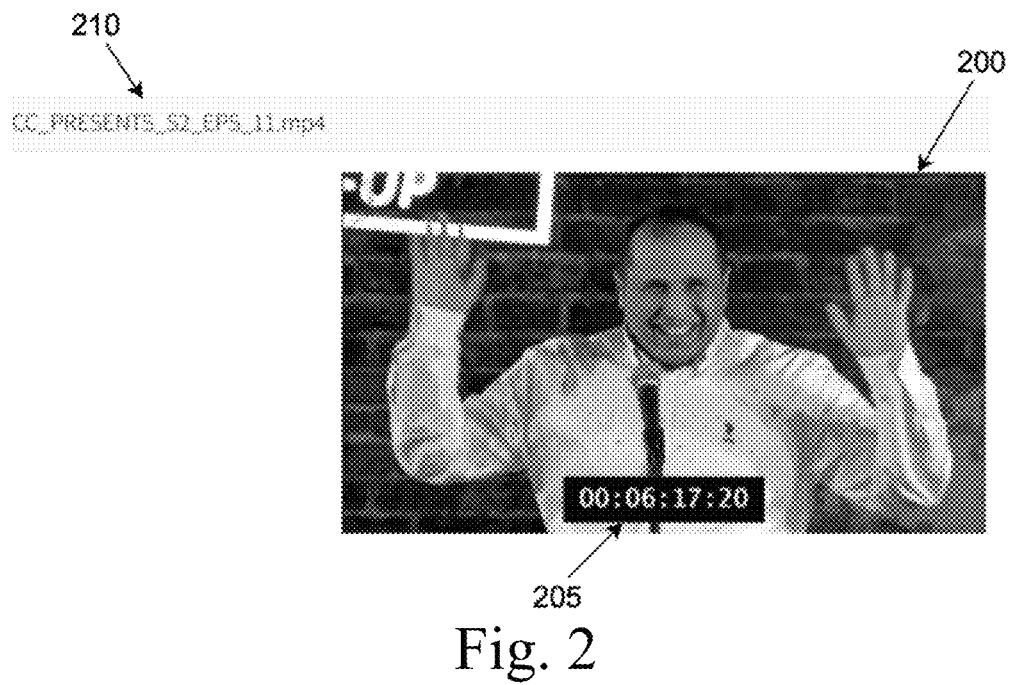
FIG. 2 shows an exemplary frame of a low-resolution proxy for a high-resolution source media content.

FIG. 2 shows an exemplary frame from a low-resolution proxy 200 for a high-resolution source media content. The proxy 200 in this example comprises a substantially smaller file size than the high-resolution source content. Importantly, the proxy 200 is generated by the content host 115 with a burned-in timecode 205 corresponding to the timecode of the source media content. That is, in each frame of the proxy 200, the timecode 205 for the source media content is displayed, e.g., at the bottom of the frame or at any other location in the frame. The term "burned-in" refers to the insertion of the time code into the frame. The underlying frames used for the proxy in this embodiment correspond exactly to the frames of the source media content.

Alternatively, the proxy may include more or fewer frames than in corresponding portions of the source content. Those skilled in the art will understand that a precise match in frame rate is not required so long as times for editing defined by a user operating on the proxy correspond suitably to the times in the source media content so that a clip generated from the source media content, defined based on times identified in the proxy, includes the content desired by the user for inclusion in the clip. The content host 115 in this embodiment provides to the remote user device 110 the low-res proxy with the burned-in timecode, reducing the data intensiveness of the transmission and/or storage that would otherwise be required if a file including a full length, high-resolution video was to be transmitted to and stored at the user device 110. The proxy 200 may be identified by a file name 210 associated with the proxy 200. Furthermore, it is noted that the clip need not be identified based on time.

Alternatively, the clip may be defined based on the content identified in the proxy file so that this same content may be included in a final clip generated based on the source media content. For example, a clip may be defined by a user based on language included in a desired clip (e.g., a portion of a script) or particular images identified. Alternatively, the clip may be defined automatically, for example, based on image analysis, etc. In another example, the source media content and/or the proxy may have metadata associated therewith defining, e.g., breakpoints corresponding to portions of the script, such as a start time and an end time for a particular scene. As would be understood by those skilled in the art, all that is required is that the content desired for inclusion in the clip be identified by a user reviewing a proxy file and that the same content be selected from the source media content to generate the clip.

The proxy 200 may be generated, for example, when the content host 115 receives a request from the user device 110. For example, a user that desires access to a timecode-accurate version of the source media content to determine a start time and end time for a high-resolution clip may send a request to the content host 115 identifying source media content from which a clip is to be generated. The proxy 200 may also be generated as an automatic process when the source content is initially stored at the content host 115, or at any other time. The proxy 200 may be stored at the content host 115 and provided to the user automatically in response to the request, for example, by transmitting the file directly to the user device 110.

In other embodiments, the proxy 200 may be generated prior to any user request and uploaded to a streaming portal accessible via a user-facing application or a web browser via the network 105. The database 120 may store a library of low-resolution, or otherwise altered, proxies 200 corresponding to every high-resolution media content stored on the database 120, or a subset thereof.

The transcoder 125 may be further configured to execute a clip editing application for generating high-resolution clips of the source media content. For example, the transcoder 125 may communicate with the database 120 to access the stored media content and, based on parameters included in a user request, generate a video clip from a source content, the video clip having the same resolution (or any other desired resolution attainable by the transcoder) as the source content. As would be understood by those skilled in the art, the video clip may be generated to include additional features stitched in with the original high-resolution source content, e.g., a logo, an endboard, or other features, to be explained in further detail below.

The low-resolution proxy generated by the transcoder 125 may be viewed at the user device 110. For example, the proxy may be streamed or downloaded by the user device. Based on the burned-in timecode of the proxy, the user determines a start time and an end time for a desired clip in times that correspond to the same content within the high-res source media content. For example, by viewing the proxy, the user may determine a point at which the clip is to start and a point at which the clip is to end. The user may further determine whether any additional features should be added to the clip, such as a logo or an endboard. These clip content determinations may be included as clip generation parameters in the request submitted by the user device so that the system can generate a clip including the desired content from the media source content as well as any additional features.

Figure 3:
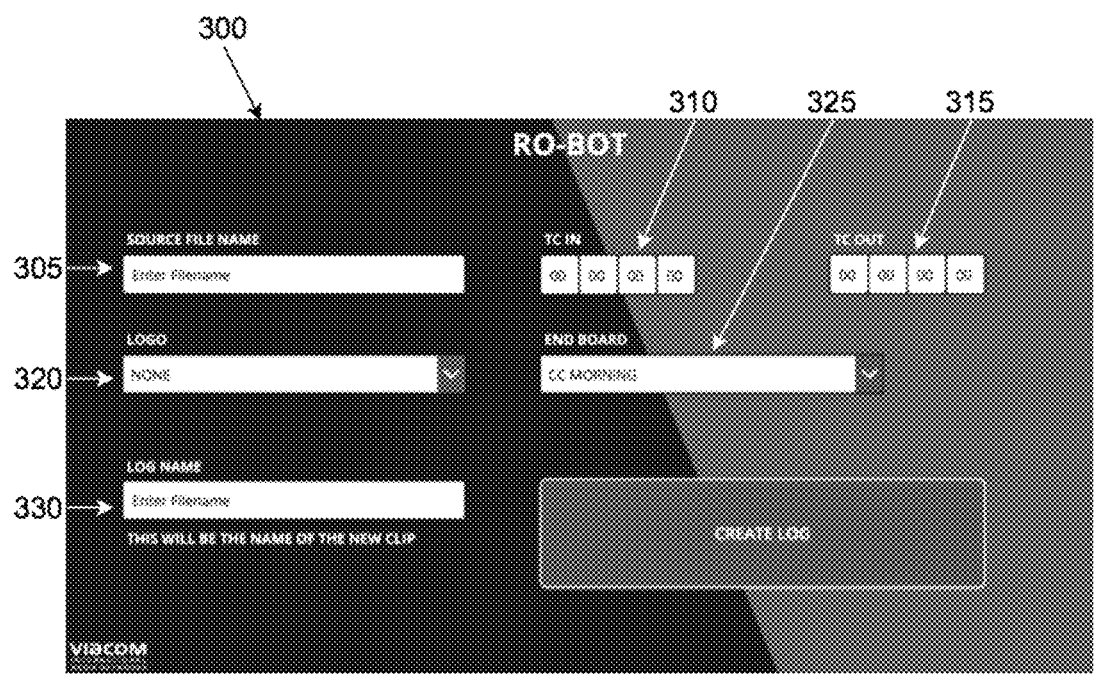
FIG. 3 shows a user-facing application for generating a user request for a media content clip.

FIG. 3 shows a user-facing application 300 for generating a user request for a media content clip. The application 300 includes a file name field 305 for identifying the source media content to be used for generating the clip. For example, the file name field 305 may indicate the file name of the source media content or of the low-res proxy 200, wherein the proxy 200 is associated with the source content at the content host 115 and the source content is identified therefrom.

The application 300 further includes a timecode field 310 for a start time of the clip and a timecode field 315 for an end time of the clip, as indicated by a user of the user device. In one embodiment, the user manually enters the timecodes for the start field 310 and the end field 315. In another embodiment, the timecode fields 310, 315 may be generated automatically from user interactions with the user device 110 while viewing the proxy 200. For example, when the viewing of the proxy 200 reaches a point at which the clip should start, the user may, e.g., click a button to automatically use a timecode corresponding to a currently displayed frame as the start field 310 in the user request application 300.

A similar process may be used for automatically determining the end field 315. In another embodiment, the user may select the start time and the end time based on metadata included the proxy. For example, the proxy may include breakpoints defining particular scenes from script of the media content.

The exemplary application 300 further includes a logo field 320 permitting a user to indicate whether and/or where a logo should be inserted into the clip and an endboard field 325 permitting a user to indicate whether and/or where an endboard should be inserted into the clip. The term "endboard" relates to a series of frames stitched into a media content at the end of a clip. The endboard may display text related to the production of the media content (e.g., a production network), a logo, or any other kind of information. A logo may also be inserted into the clip so that the logo is displayed in each frame or any desired subset of frames. For example, the logo may be displayed in a semi-transparent or non-transparent manner in a predetermined or user selected location in the frame (e.g., a corner of the frame).

In this example, the logo field 320 and endboard field 325 comprise a basic positive or negative (yes/no) for whether the logo and the endboard should be included. Accordingly, the transcoder 125 may have a particular logo and/or endboard associated with the source media content, which are included when the transcoder 125 generates the clip. However, in other embodiments, a selection amongst multiple logos and/or endboards and multiple locations may be available in the application 300, or fields for indicating custom designs and/or content of the logo and/or endboard. Although only the logo field 320 and the endboard field 325 are shown, additional features for the clip may be indicated in the request. For example, some introductory content may also be included in the frames at the start of the clip.

The application 300 additionally includes a log name field 330 for indicating a file name for the clip to be generated. Thus, the clip may be identified by the user, for example if the clip is uploaded to a portal including multiple other clips generated for other purposes. When the fields 305-330 are satisfactorily filled, the user may execute the application 300 and transmit the request, including parameters corresponding to the entered fields, to the content host 115.

The request transmitted to the content host 115 may include parameters for the fields 305-330 discussed above, i.e., parameters for identifying the source media content, a start time and end time for the clip to be generated, a logo or endboard, a file name, as well as any additional features to be included in the clip. The request may be transmitted directly to the content host or may be received at the content host via alternative communication paths, e.g., routed via one or more intermediate servers or other entities.

In one embodiment, when the request is received at the content host 115, a number of automated workflows may be triggered. For example, a record may be inserted in the database 120 using a Stored Procedure, and a task XML may be generated. The task XML may then be dropped on an FTP (File Transfer Protocol) folder that is picked up by the transcoder 115.

The transcoder 115 in this embodiment then executes a clip generation process based on the parameters included in the task XML. For example, the transcoder 115 may generate a clip of the identified source media content having the frames included between the start time and the end time indicated in the request. The clip may further include frames for, e.g., an endboard. A logo or some other feature may be stitched into the clip in one or more frames.

The process flow described above is provided only for exemplary purposes. Other process flows may be implemented to generate the clip according to the requested parameters, depending on the transcoder arrangement and network architecture of the content host 115.

As noted above, the clip is generated so that the quality of the clip is equivalent to that of the source content and includes the content equivalent to that selected from the proxy file. In other embodiments, the clip may be generated having a quality different from the source content, or in a format different than that of the source content so long as the format of the clip is in some way, satisfying to the user. For example, an mp4 format, a QuickTime format or an mpeg2 Material Exchange Format (MXF) may be used for the clip, even when the source content comprises a different format. The format and quality options may be dependent on the capabilities of the transcoder(s) used by the content host 115. A desired format and/or quality may also be indicated in the clip request, in addition to the other parameters discussed above.

Once generated, the clip may be made available to the user device 110. For example, the clip may be uploaded to a cloud server, transmitted directly to the user device 110, emailed to an address associated with the user device 110 or emailed or transmitted in any manner to any desired receiving device from which the clip will be posted to a desired end platform, etc. When the clip is made available to the user device 110, the user device 110 may store the clip, post the clip to a digital platform, or use the clip in different ways as would be understood by those skilled in the art.

Thus, according to the exemplary embodiments described herein, a user device with limited processing/storage capabilities may be permitted to create a clip that is high-resolution or otherwise compatible with the quality of original media source content. By viewing a (e.g., low-resolution) proxy and determining clip generation instructions based thereon, the user device 110 can avoid storing and editing the original (e.g., high-resolution) video content, instead allowing the content host for the video content to perform the content editing and clip generation.

In this way, the user device may be provided the high-resolution clip without increasing the risk of piracy of the original media source content and/or allowing a user and user device to define edits without obtaining and manipulating data intensive files. This also allows the editing to be done without resorting to the typically required specialized video editing software and/or large data storage capacities.

Figure 4:
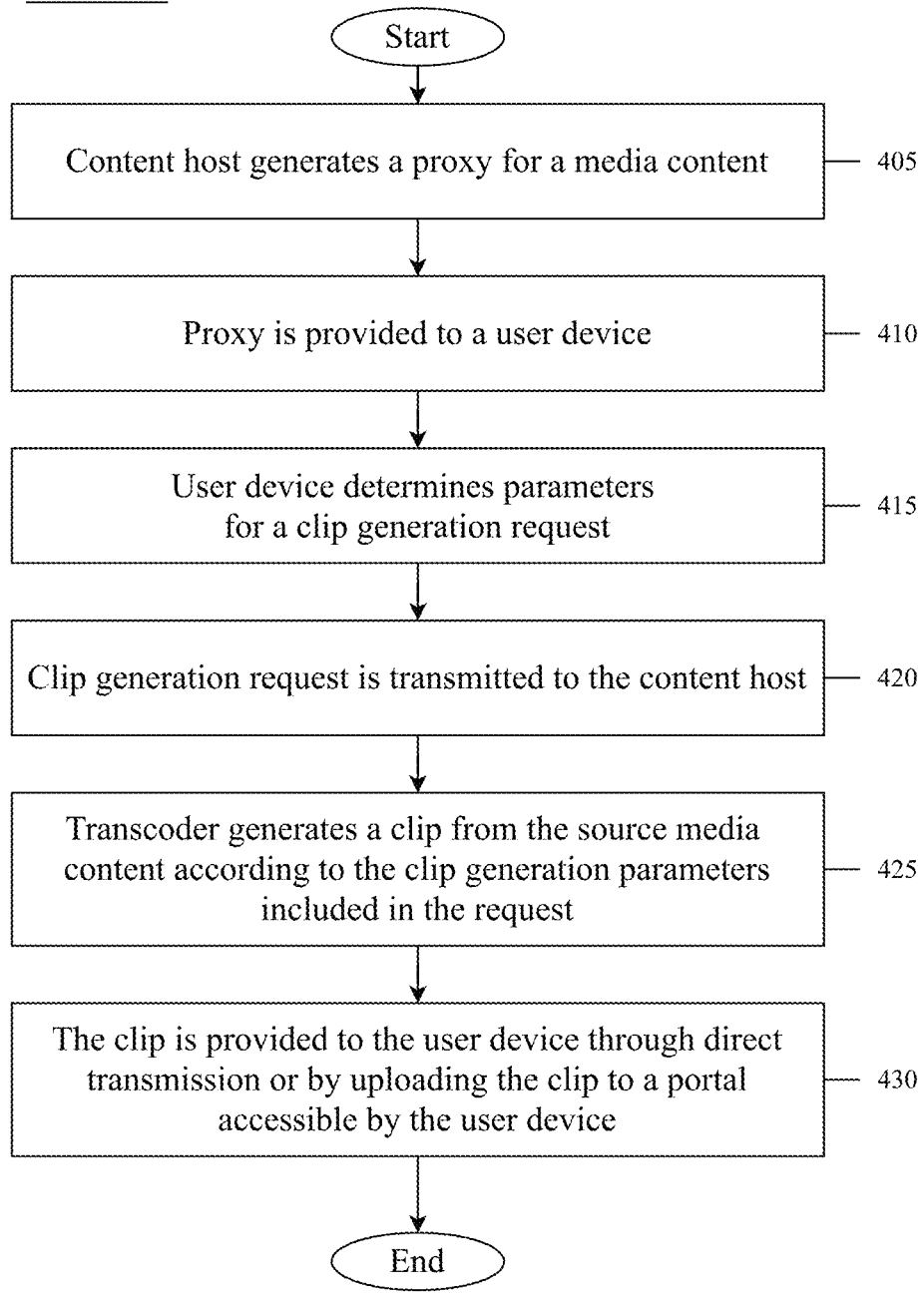
FIG. 4 shows a method for generating a clip of a source media content according to various exemplary embodiments.

FIG. 4 shows a method 400 for generating a clip of a source media content according to various exemplary embodiments. The method 400 will be described with regard to the components included in the arrangement 100 of FIG. 1.

In 405, the content host generates a proxy for at least a portion of a media content, e.g., a lower-resolution proxy of a high-resolution video. The proxy includes data sufficient to enable a remote user device to identify a portion of content of the media content to be included in a clip. In this embodiment. the proxy is generated by a transcoder used by the content host. The proxy may be generated upon request by a user device or some other entity, automatically when the media content is first stored at the content host, or as a result of other types of triggers. The proxy in this embodiment is generated to include a burned-in timecode on each frame of the proxy, or a subset thereof, that corresponds to the timecode of the media content from which the proxy was created to the extent necessary to ensure that clips defined from the source media content based on the proxy include basically the same content as that represented in the clip as viewed by the user when manipulating the proxy.

In 410, the proxy is provided to the user device. For example, the proxy may be transmitted directly to the user device, uploaded to a cloud server and/or portal and made available to the user device, accessed via web-browser, or provided in other ways.

In 415, the user device determines parameters for a clip generation request. For example, in this embodiment, a user-facing application is executed at the user device in which the proxy is displayed/viewed and instructions are entered via an aspect of the application for generating a clip request. Various fields are filled in manually by a user, or certain fields may be filled in automatically based on user selections performed during the viewing of the proxy. The fields may include, for example, a starting timecode and an ending timecode for the clip, indications for a logo and/or an endboard to be included in the clip, and/or fields pertaining to other features for the clip. The contents of the fields are converted into parameters for the request.

In 420, the clip generation request is transmitted to the content host. The request transmission may trigger a series of workflows at the content host, wherein the transcoder is notified of the clip generation parameters.

In 425, the transcoder generates the clip from the source media content according to the clip generation parameters included in the request. For example, the clip is generated with frames included from the starting timecode and the ending timecode included in the request, which correspond precisely to the proxy used by the user device. Additional frames, e.g. an endboard, may be included, and a logo or other features may be inserted into the clip. By using the source media content to generate the clip, the transcoder may generate a high-resolution clip based on parameters determined from the low-resolution proxy.

In 430, the clip is provided to the user device, for example through direct transmission or by uploading the clip to a portal accessible by the user device. The clip may be uploaded using a file name corresponding to a file name included in the request, so that the user may identify the requested clip. The user device may proceed to use the clip in any of a variety of manners, e.g., in a post to a digital platform.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above-described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A system for remote editing of a file, comprising:
a database including a plurality of source media content files; and
a content host comprising a transcoder configured to generate a first proxy for at least a portion of a first one of the source media content files, the first proxy including data sufficient to enable a remote user device to identify a portion of content of the first source media content file to be included in a generated clip without permitting the user to access the first source media content file, the content host further comprising a processing apparatus configured to receive from the remote user device a request to create the generated clip from the first source media content file, the request indicating parameters defining, based on the data in the first proxy, the portion of the first source media content file to be included in the generated clip, the processing apparatus configured to generate and provide to the transcoder a task XML including the parameters, the transcoder configured to create the generated clip based on the parameters indicated in the task XML, wherein the first source media content file is user selected in the request.

2. The system of claim 1, wherein the content host comprises:
a communications interface configured to provide the first proxy to the remote user device and receive the request from the remote user device.

3. The system of claim 2, wherein the first proxy is generated having a timecode corresponding to a timecode of the first source media content file.

4. The system of claim 3, wherein the request includes a starting timecode and an ending timecode for the generated clip, the starting and ending timecodes determined based on the first proxy demarking content in the first proxy that is the same as content demarked by the same starting and ending timecodes in the first source media content file.

5. The system of claim 2, wherein the first proxy is generated having metadata associated therewith indicating start times and end times for predefined clips.

6. The system of claim 2, wherein the first proxy is generated having a resolution lower than a resolution of the first source media content file.

7. The system of claim 2, wherein the first proxy is generated having a watermark inserted into the content of the first source media content file.

8. The system of claim 2, wherein the generated clip is created having a resolution that is the same as a resolution of the first source media content file.

9. The system of claim 2, wherein the communications interface provides the first proxy to the remote user device via direct transmission or by uploading the first proxy to a web-based portal.

10. The system of claim 2, wherein the request includes indications for including at least one of a logo or an endboard in the generated clip.

11. The system of claim 2, wherein the request includes indications for at least one of a resolution or a format of the generated clip.

12. The system of claim 2, wherein the processing apparatus inserts a record in the database based on the request.

13. The system of claim 1, wherein the first proxy is generated automatically when the first source media content file is initially stored at the content host or the database.

14. The system of claim 1, wherein the request includes a user generated identifier for the first source media content file from the database.

15. A user device, comprising:
a display;
a communications interface; and
a processor configured to perform operations including:
displaying a proxy for at least a portion of a source media content file, the proxy including data sufficient to enable the user device to identify a portion of content of the source media content file to be included in a generated clip without permitting the user device to access the source media content file; and
transmitting, by the communications interface, a request to create the generated clip from the source media content file, the request indicating parameters defining, based on the data in the proxy, the portion of the source media content file to be included in the generated clip, wherein the request further includes indications for including at least one of a logo or an endboard in the generated clip,
wherein the source media content file is user selected in the request.

16. The user device of claim 15, wherein the processor is further configured to receive, via the communications interface, generated clips generated from the source media content file based on the parameters indicated in the request and including the at least one of the logo or the endboard indicated in the request.

17. The user device of claim 15, wherein the processor is configured to read a timecode of the proxy that corresponds to a timecode of the source media content file.

18. The user device of claim 17, wherein the request includes a starting timecode and an ending timecode for the generated clip, the starting and ending timecodes being determined based on the data of the proxy.

19. The user device of claim 15, wherein the processor is configured to read from the proxy metadata indicating start times and end times for predefined clips, wherein the parameters defining the portion of the source media content file to be included in the generated clip being indicated based on the metadata.

20. The user device of claim 15, wherein the proxy has a resolution lower than a resolution of the source media content file and is stored or streamed at the user device.

* * * * *